March 6, 1934.  A. DINA  1,949,456
MECHANICAL MOVEMENT FOR MOTION PICTURE MACHINES
Filed April 1, 1930  7 Sheets-Sheet 5

INVENTOR
Augusto Dina
BY
Howard W. Dix
ATTORNEY

March 6, 1934.    A. DINA    1,949,456

MECHANICAL MOVEMENT FOR MOTION PICTURE MACHINES

Filed April 1, 1930    7 Sheets-Sheet 7

Inventor
Augusto Dina
By his Attorney
Howard W. Dix

Patented Mar. 6, 1934

1,949,456

UNITED STATES PATENT OFFICE 1,949,456

MECHANICAL MOVEMENT FOR MOTION PICTURE MACHINES

Augusto Dina, Elizabeth, N. J., assignor to International Projector Corporation, New York, N. Y., a corporation of Delaware Application April 1, 1930, Serial No. 440,728

15 Claims. (Cl. 88—17)

This invention relates to a new and useful and improved framing mechanism for motion picture machines.

A main object of the invention is to provide such an improved framing mechanism or system having simple and efficient co-operating elements so that the elements may be readily manipulated to change the relation, for instance, of the film intermittent sprocket, or similar element, in respect to the film aperture without varying the inter-system relations of the main elements.

A further object is to provide such an improved mechanism that the changes thus made in the motion or position of any such part with respect to any factors outside the system or mechanism, may take place even while the elements of the mechanism are proceeding through their regular cycle of operation and being driven by an outside source of power.

Further and more specific objects, features, and advantages will more clearly appear from the detailed description given below when taken in connection with the accompanying drawings which form part of the specification and which illustrate the present preferred form of the invention.

In the general contemplation of the invention in which is incorporated the new and improved framing mechanism, it is to be noted that certain shafts such as the intermittent film sprocket shaft and the shutter shaft and certain connecting mechanism, either intermittently moving or continuously moving, are, under normal conditions, so related that they have a regularly recurring cycle of operation during which they have a regular succession of inter-system relations. These inter-system relations ordinarily are very important and should be maintained constant at all times during the cycles even though it may become desirable to change the extra-system relations of one or more of the elements. To accomplish this end without disturbing the inter-system relations is the essence of the present invention.

Briefly the mechanism comprises a shaft of the intermittent film sprocket so mounted in a frame that it may be rotated or oscillated while permitting the shaft to be rotated in it; a second shaft such as a shutter shaft; and suitable mechanism connecting the two shafts with a driving unit. The elements involved are so arranged on the frame that the angular position of the sprocket shaft can be changed relative to extra-system factors by swinging the frame through a desired angle in either direction from normal and the various connecting and driving elements are moved therewith without disturbing their cyclic relation. In such changes, the shutter shaft is also moved but not in a manner to cause angular movement thereof. The relation between the shutter shaft and the connecting elements remains undisturbed. Means are provided to independently adjust the angular position of the shutter shaft at any time, if desired.

The shutter shaft is so connected to the mechanism that any slight movement of it during the adjustment of the sprocket shaft will be in a straight line and therefore the simplest possible. This movement is effected generally by providing the frame with a gear or element which rotates therewith and is of the same diameter as that of a gear which meshes with a worm on the shutter shaft. The first mentioned or control gear connects to a rack on a shaft connected to the shutter shaft so that as the frame is moved the shutter is moved a longitudinal distance equal to that through which it would be moved if the gear in mesh with its worm were driving it. Consequently the frame may be moved through an angle to adjust the sprocket shaft without causing any change in the relation between the connecting mechanism and the shutter shaft.

The present preferred form of the invention is illustrated in the drawings, in which.

Figure 1:
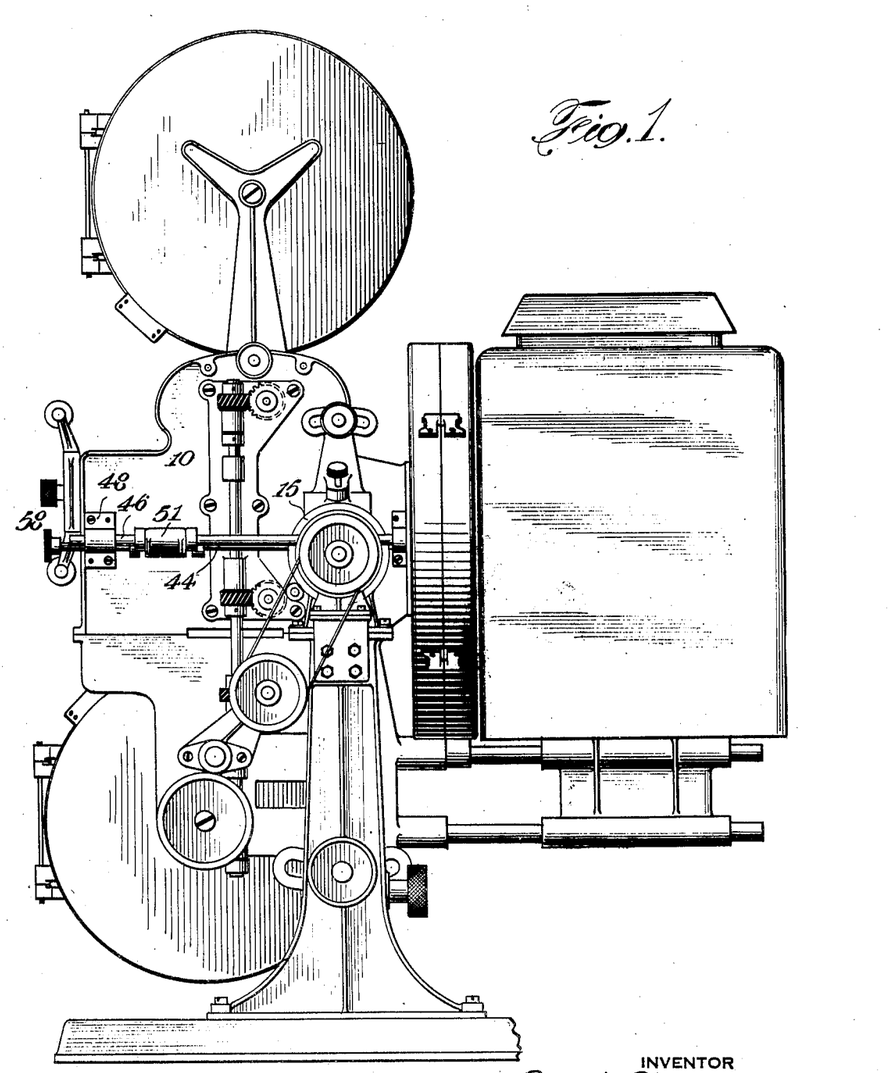
Fig. 1 is a side elevation of a motion picture projector in which is embodied the invention herein.

As shown in the drawings, the present preferred form of the improved mechanism comprising this framing device is mounted on the central partition plate or wall 10 of the motion picture projector shown in Fig. 1, which may have a raised dais portion 11 supporting a bed plate 12 for a driving motor 13. Any other suitable driving means may be employed if desired. The wall 10 forms a support for a bearing casing 15 preferably having a smooth cylindrical interior, the center of which is in alinement with the axis of the drive shaft 16 of the motor 13.

Figure 6:
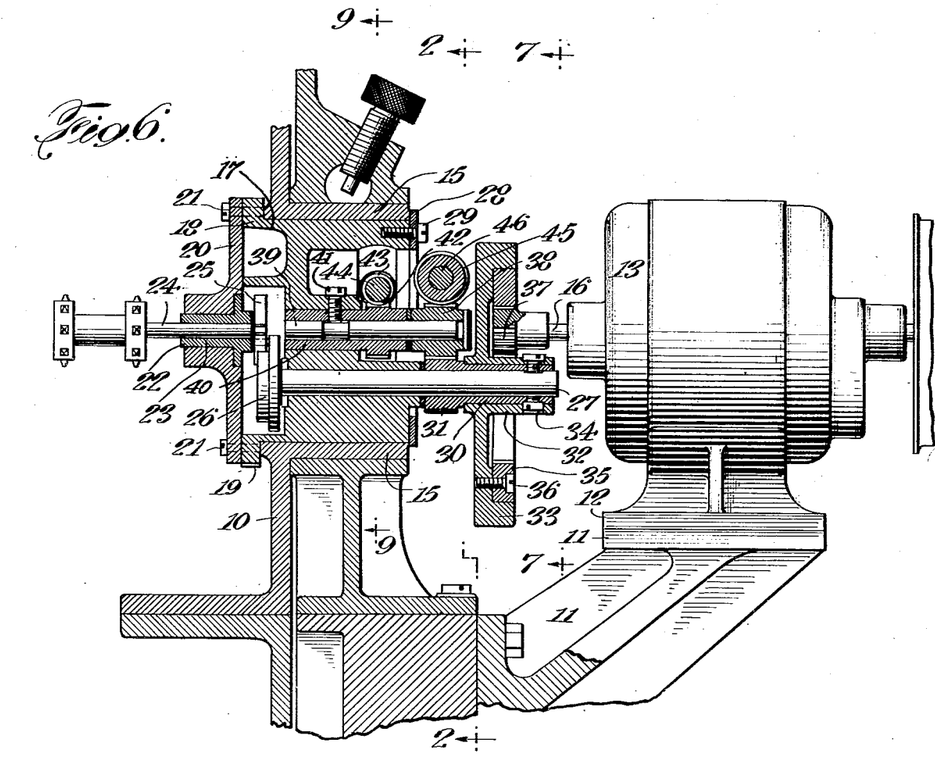
Fig. 6 is a transverse vertical section taken on the line 6—6 of Fig. 2.
Figure 7:
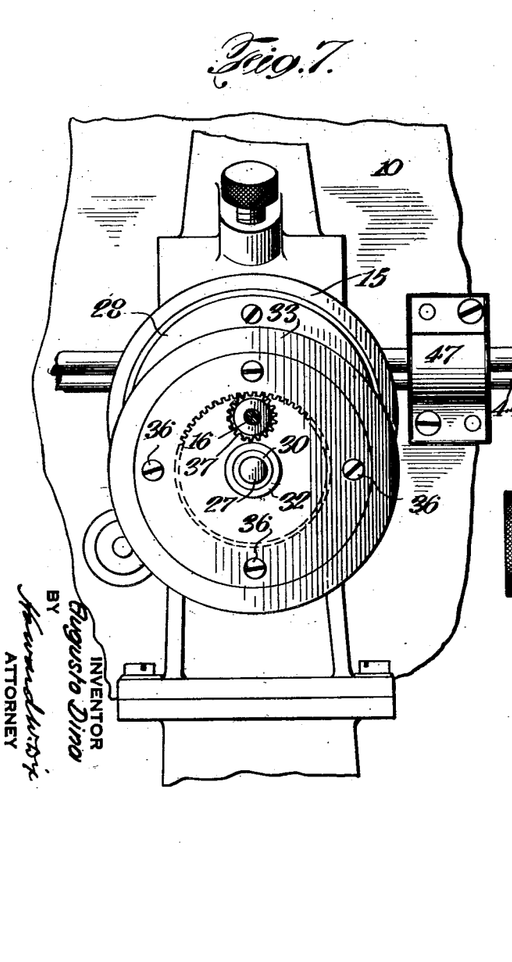
Fig. 7 is a longitudinal vertical section taken on the line 7—7 of Fig. 6.

Disposed within the casing 15 (see Fig. 6) is a rotor frame 17 having chambered portions. Along one face of this rotor 17 there is provided an integral flange 18 having peripheral teeth 19 thereon. A cover plate 20 is held to the face of the flange 18 by suitable means such as screws 21. This cover plate has a central boss 22 or journal member the axis of which is in line with the center of the rotor 17 and is bored to receive a flanged bushing 23 embracing the sprocket shaft 24 extending into the chambered portion of the rotor 17 and carrying on its inner end one member of a mechanism such as the star wheel 25. This star wheel 25 is adapted to and does engage with a co-operating element such as the pin wheel 26 mounted on one end of a shaft 27 journalled for rotation in the rotor 17. The star wheel 25 and the pin wheel 26 constitute what is commonly known as a Geneva movement.

The opposite face of the rotor is engaged by a clamping ring or plate 28 which is fastened to the face of the rotor frame 17 by any suitable means such as screws 29 and abuts the adjacent face of the casing 15 and tends to hold the rotor within the casing 15. The shaft 27 extends from the rotor 17 and on its outer end is fixed a sleeve 30 one end of which is formed as a pinion 31 preferably a worm pinion and the other end of which is fastened to the shaft 27 by any suitable means such as screws 34. The fly-wheel 33 may be driven in any suitable manner but preferably is provided with an internal ring gear 35 fastened thereto by screws 36. This ring gear 35 is engaged with the driving pinion 37 on the shaft 16 of the motor 13. The axes of the shafts 24, and 16, and the pinion 37 are in alinement with the center of rotation of the rotor frame 17.

The worm gear 31 on the shaft 27 is adapted to mesh with another worm gear 38 which is rotatably mounted on a stub shaft 39. This stub shaft 39 is disposed within a sleeve 40 and fastened therein by any suitable means such as a set screw 41. The sleeve 40 is fixed in a central chambered portion of the rotor so that the axis of the stub shaft 39 is in line with the axes of the shafts 24 and 16 above mentioned. The stub shaft 39 and the sleeve 40 are fixed to the rotor frame 17 and move therewith.

On the sleeve 40 there is preferably integrally formed a gear 42 within one of the chambered portions of the rotor 17. This gear 42 meshes with a cylindrical rack gear 43 mounted fixedly on a shaft 44. The worm gear 38 meshes with a worm 45 mounted fixedly on the shutter shaft 46. The shafts 44 and 46 are mounted for longitudinal and rotatable movement in bearing brackets 47 and 48 disposed at opposite ends of the shafts and fastened to the vertical partition 10 near its opposite ends. However these brackets may be located at any desired position so long as they support the shafts.

On the shutter shaft 46 near one of the brackets 48 there are fastened a pair of collars 49 and 50 and between these collars on the shutter shaft 46 there is confined a suitable yoke member 51 which loosely surrounds the shaft 46. This yoke member has lateral extensions 52 and 53. One of these extensions such as 53 is split and is adjustable by means of the clamping screw 54 to tighten it on the shaft 44 which at this portion is threaded as at 55 to engage with similar threads on the inner surfaces of the extensions 52 and 53. Adjacent the extensions 52 and 53 on the shaft 44 but not closely abutting them are fastened two collars 56 and 57. One end of the shaft 44 is provided with a hand knob 58 so that the shaft 44 may be turned as desired.

It will be seen from a consideration of Figs. 2, 3, 6, and 9, and 10, that the shaft 44 passes through the casing 15 and the rotor 17 and consequently the casing 15 is apertured to receive the shaft 44 and the rotor 17 has slots 59 and 60 to receive the shaft 44 and yet to permit the rotor 17 to be turned the requisite amount. The ends of these slots naturally acts as stops to the movement of the rotor frame 17.

Figure 8:
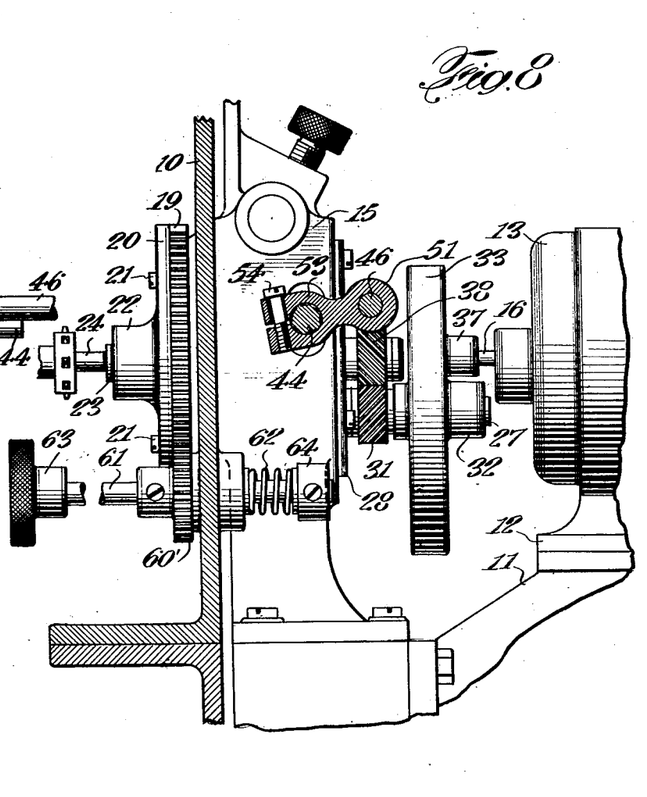
Fig. 8 is a transverse vertical section taken on the line 8—8 of Fig. 3.

In order to turn the rotor frame 17, the flange teeth 19 are engaged by a pinion 60' fixed to the shaft 61 journalled in the wall 10. On one side of the wall 10 a spring 62 lies around the shaft 61 and between the wall 10 and a collar 64 fixed to the end of the shaft 61 to urge the shaft to the right as viewed in Fig. 8. The other end of the shaft 61 is provided with a hand knob 63 whereby the pinion 60' may be turned and thus rotate or oscillate the rotor frame 17.

*Operation*

Figure 2:
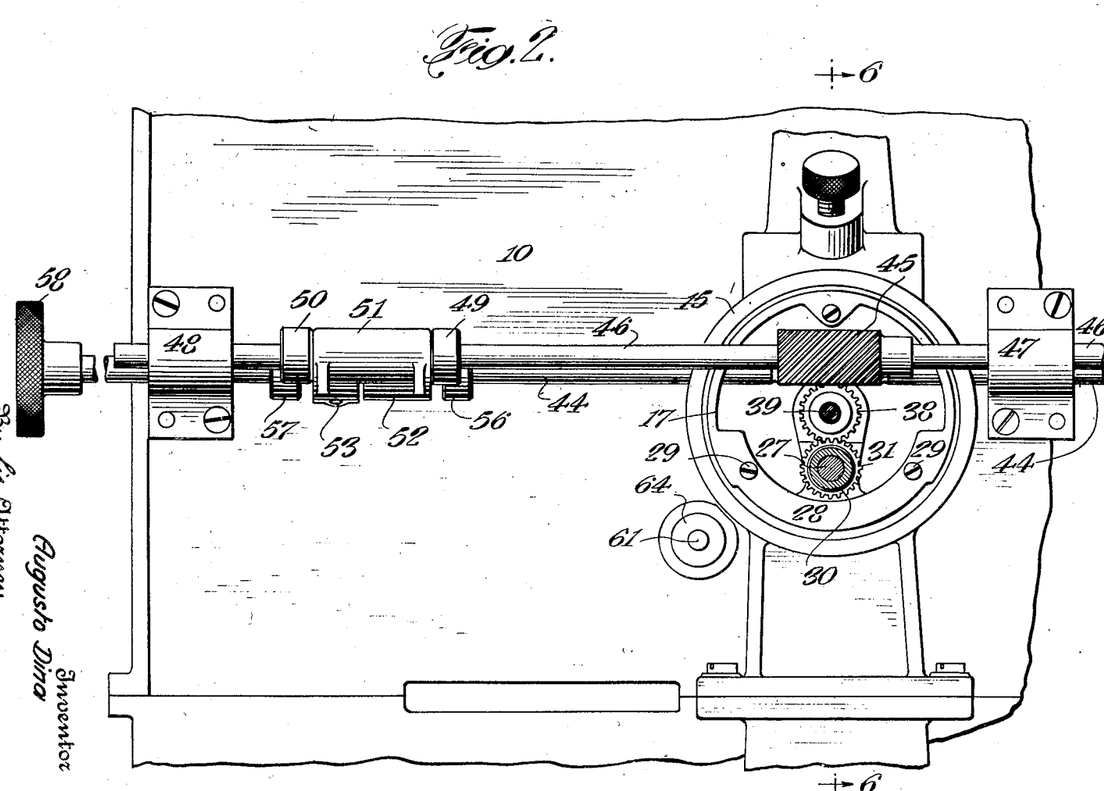
Fig. 2 is a vertical longitudinal section, showing one face of the device, and taken on the line 2—2 of Fig. 6.
Figure 3:
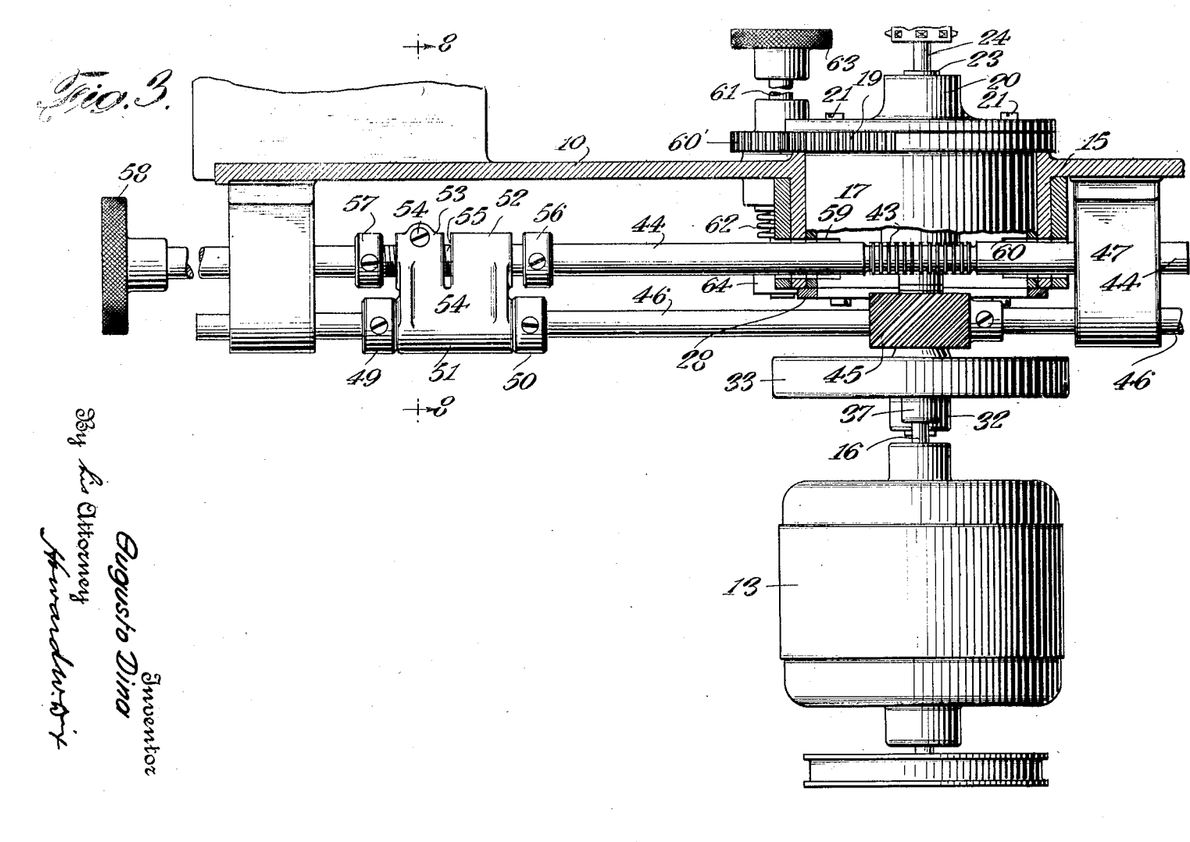
Fig. 3 is a top plan view of the mechanism.
Figure 4:
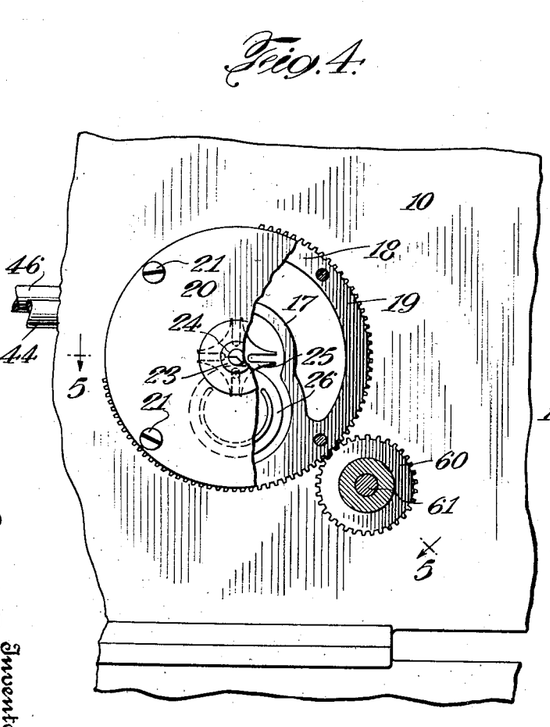
Fig. 4 is a rear elevation of the mechanism.
Figure 9:
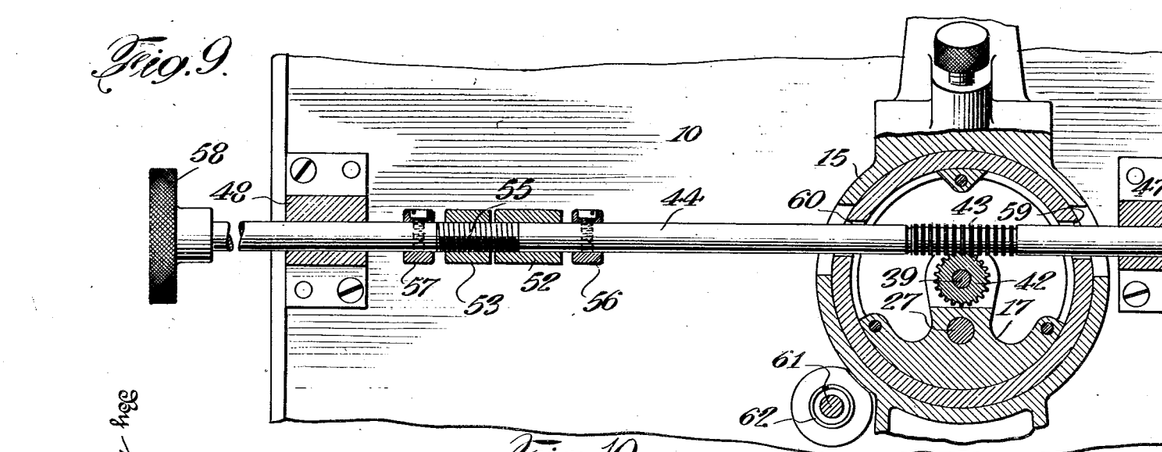
Fig. 9 is a longitudinal vertical section taken on the line 9—9 of Fig. 6.

Let it be assumed that the parts have the normal positions shown in Figs. 1, 2, and 9, and that the motor 13 is driving the mechanical mechanism illustrated. This drive will be through the shaft 16, pinion 37, ring gear 35, flywheel 33, shaft 27, worm gear 31, worm idler gear 38, loose on shaft 39, to worm 45 on the shutter shaft 46 which will thus be rotated. This shutter shaft 46 may be connected to any desired device or mechanism to be driven. The motor drive is also from the shaft 16, pinion 37, ring gear 35, fly wheel 33, shaft 27, pin wheel 26, star wheel 25, to sprocket shaft 24 which is thus rotated and which may be connected to the film sprocket, particularly the intermittent film sprocket.

Figure 5:
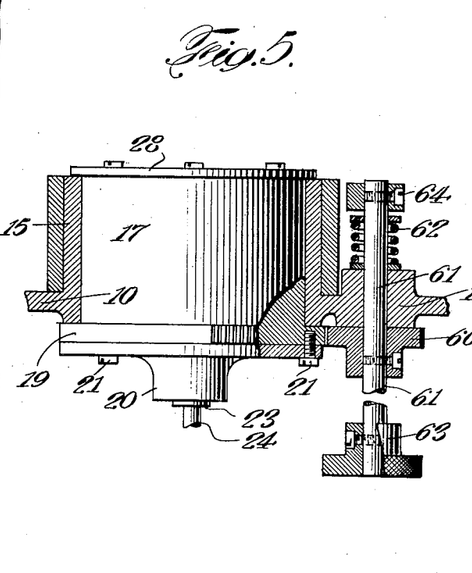
Fig. 5 is a section taken on the line 5—5 of Fig. 4.

These two shafts, the shutter shaft 46 and the sprocket shaft 24, in their relative rotations have a constantly recurring cycle of movements which are the same for each succeeding cycle. If at any time it is desired to change the position of one of these shafts with regard to a factor outside the system of mechanism of which it is a part, then the mechanism provided herein will permit this to be done. Such movement may be made without disturbing the inter-system status or cyclic conditions. For instance, if it is desired to change the extra-system relation of the sprocket shaft 24 then the knob 63 (see Fig. 5) is operated to turn the rotor frame 17 which will then move the shaft 27 around the center of the rotor frame 17 which center also coincides with the axes of the shafts 24, 39, and 16. This movement will tend to roll the worm gear 31 around the worm gear 38 which is an idler. This movement would tend to cause a rotation of the worm 45. It is however the object of the invention to change the extra-system relation of shaft 24 without changing the angular position of the shaft 46 with respect to the shaft 24 and without changing the inter-system relations between the pin wheel 26, the star wheel 25, and both of the above mentioned shafts. This is the reason there is provided the gear 42 and the shaft 44 which carries the cylindrical rack 43. It will be seen that when the frame 17 is rotated, the gear 42 is rotated also for it is fixed to the frame. Since gear 42 is of the same pitch and diameter as the worm gear 38, there will be a movement of the gear 38 for the reason that the rotation of gear 42 causes a longitudinal movement of the shaft 44 and such movement of that shaft moves shaft 46 due to the connecting yoke 54. The worm gear 45 will cause the gear 38 to revolve an amount equal to that of gear 42. Thus, there will be a like amount of angular movement of both gears 42 and 38. Thus the worm 45 is made to move a longitudinal distance equal to that it would traverse if there were pure rolling between it and the worm gear 38. Therefore the worm gear is made to rotate the same angle as the gear 42 while the angular position between it and the worm gear 31 is not changed. The shaft 46, namely the shutter shaft, is thus moved longitudinally in a straight line a distance equivalent to the arc of contact between it and the worm gear 46 and no angular movement of the shaft takes place.

This mechanism therefore will move or revolve the specified assembly around the center of the rotor 17 as a unit and will not change the inter-system relations. The only effect of the movement is to change the extra-system relations of the sprocket shaft as in framing and to slide the shutter shaft 46 somewhat in a straight line but not to move it angularly.

It is apparent that the knob 58 may be turned at any time during the operation of the mechanism and when this happens the shaft 44 is turned. This turning will have no effect on the gear 42 since the rack 43 is straight cylindrical rack, but the turning of the shaft 44 will effect the yoke 51 because the threads 55, which being turned, will advance the yoke and with it the shaft 46 of the shutter. This will cause the drive of the worm 45 over the worm gear 38 and will result in the turning of the shutter shaft 46 the desired amount even while it may be driven by the motor 13. This will change the inter-system relation between the shutter shaft 46 and the other elements above mentioned but will not otherwise disturb them.

Figure 10:
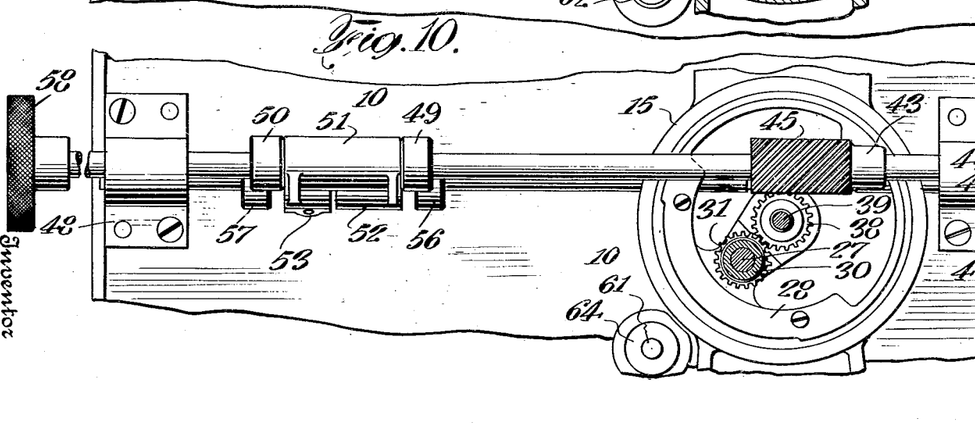
Fig. 10 is a similar view showing the parts in a different position.

In Fig. 10 it will be seen that the swing of the rotor frame 17 from one side of its normal position shown in Fig. 9 can be as much as 45 degrees, and a swing to the same extent in the opposite direction from normal is permitted. This permits a great range in the ability to shift the extra-system relations as desired without disturbing the inter-system relations as above described. The shaft 46 moves in a straight line during such adjustments.

The mechanism above set forth will thus permit the rapid and easy adjustment of the extra-system relations even while the motor 13 is driving the mechanism and will also permit the shaft 46 to be shifted at any time. During the change in the extra-system relations the inter-system relations are not disturbed and the cyclic relations can continue as before. Only two knobs need be operated. One is the knob 63 to shift the rotor 17 and the other is the knob 58 to longitudinally shift the shaft 46.

It will be seen from the foregoing description that with the improved mechanism herein, when there is a change to meet any extra-system condition, there will be maintained the synchronism between the main elements of the mechanism inter-system thereby preventing the undesirable feature of changes in inter-system conditions when making extra-system adjustments. This mechanism also causes the shutter and the framing device to move in synchronism while allowing for the separate adjustment of the shutter.

While the invention has been described in detail and with respect to a present preferred form thereof, it is not to be limited to such details and forms since many changes and modifications may be made and the invention embodied in other forms and modifications without departing from the spirit and scope of the invention in its broadest aspects. Hence it is desired to cover any and all forms and modifications of the invention which may come within the language or scope of any one or more of the appended claims.

What is claimed, is,

1. A framing mechanism for motion picture machines which comprises a sprocket shaft and a shutter shaft, a rotor, mechanism interconnecting said shafts and movable with the rotor, and means actuated by and movable proportionate to the movement of the rotor to cause extra-system cyclical adjustment of one shaft without disturbing the inter-system cyclical relations.

2. In a framing mechanism for motion picture machines which comprises a sprocket shaft and a shutter shaft, a rotor centered about the axis of one of said shafts, mechanism interconnecting said shafts and movable with the rotor, and means actuated by and movable proportionate to the movement of the rotor to cause extra-system adjustment of one shaft without disturbing the inter-system cyclical relations.

3. In a framing mechanism for motion picture machines which comprises a sprocket shaft and a shutter shaft, a rotor centered about the axis of one of said shafts, mechanism interconnecting said shafts and movable with the rotor, and means actuated by and movable proportionate to the movement of the rotor to cause extra-system adjustment of one shaft without disturbing the relative rotational positions of said two shafts.

4. In a framing mechanism for motion picture machines which comprises a sprocket shaft and a shutter shaft, a rotor, mechanism interconnecting said shafts and movable with the rotor, and means to move the mechanism as a whole around one shaft without changing the angular cyclical relations of the two shafts.

5. In a framing mechanism for motion picture machines, which comprises a sprocket shaft and a shutter shaft, a rotor, mechanism interconnecting said shafts and movable with the rotor, and means actuated by movement of the rotor to move one of said shafts as to its extra-system adjustments without changing the cyclical relations between the two shafts.

6. In a framing mechanism for motion picture machines which comprises a sprocket shaft and a shutter shaft, a rotor, mechanism interconnecting said shafts and movable with the rotor, and means on the rotor and actuating the shutter shaft to cause the rotation of the sprocket shaft without changing the angular cyclical relation between the shafts.

7. In a framing mechanism for motion picture machines which comprises a sprocket shaft and a shutter shaft, a rotor, mechanism interconnecting said shafts and movable with the rotor, and means on the rotor and actuating the shutter shaft to permit rotation of the sprocket shaft and a longitudinal displacement of the shutter shaft proportional to the movement of the rotor.

8. In a framing mechanism for motion picture machines which comprises a rotor, a sprocket shaft centered therein, mechanism connecting the sprocket shaft with a shutter shaft and comprising gearing, means for moving the rotor and the gearing to change the angular position of the sprocket shaft without changing the angular relation between the two shafts and without changing the cyclical relations between the shafts and the gearing.

9. In a framing mechanism for motion picture machines which comprises a rotor, a sprocket shaft centered therein, mechanism connecting the sprocket shaft with a shutter shaft and comprising gearing, a gear fixed to the rotor, a control shaft connected to and actuated by said fixed gear and connected to the shutter shaft to move the shutter shaft longitudinally a distance proportional to the movement of the rotor.

10. In a framing mechanism for motion picture machines which comprises a sprocket shaft and a shutter shaft, a rotor on which one shaft is mounted, means for moving the rotor around a center to change the angular position of one of said shafts, gearing connecting said shafts, and means movable with the rotor and engageable with the shutter shaft to cause a longitudinal displacement thereof proportionate to the angular movement of the rotor.

11. In a framing mechanism for motion picture machines which comprises a sprocket shaft and a shutter shaft, one of which is mounted on a rotor, and movable therewith, gearing connected to said last mentioned shaft, one of the gears connected to the shutter shaft, said rotor movable around a given center to revolve the sprocket shaft and the gearing, and means to cause only longitudinal straight line movement of the shutter shaft during this movement of the rotor.

12. In a framing mechanism for motion picture machines which comprises a sprocket shaft and a shutter shaft at right angles to each other, a rotor on which one of the shafts is mounted centrally for rotation with the rotor, gearing connecting the shafts, and mounted on the rotor and movable therewith, and means on the rotor and movable therewith to engage the second shaft during angular movement of the rotor and transmit to the shutter shaft only longitudinal movement.

13. In a framing mechanism for motion picture machines which comprises a sprocket shaft and a shutter shaft at right angles to each other, a rotor on which one of the shafts is mounted centrally for rotation with the rotor, gearing connecting the shafts and mounted on the rotor and movable therewith, a gear on the rotor, a rack meshing therewith and engageable with the shutter shaft, and means transmitting to the shutter shaft only longitudinal movement as the sprocket shaft is rotated.

14. In a framing mechanism for motion picture machines which comprises a sprocket shaft and a shutter shaft at right angles to each other, a rotor on which one of the shafts is centrally mounted for rotation therewith, gearing connecting the two shafts and including a worm on the shutter shaft and a worm gearing meshing therewith, a gear fixed to the rotor and of the same diameter as the worm gear, a rack meshing with said gear fixed on the rotor, a shaft on which the rack is mounted, said last named shaft connected to the shutter shaft to cause a longitudinal displacement of the shutter shaft proportionate to the angular movement of the rotor.

15. In a framing mechanism for motion picture machines which comprises a sprocket shaft and a shutter shaft at right angles to each other, a rotatable casing on which the sprocket shaft is centrally mounted for rotation therewith, a star wheel on the sprocket shaft, a pin wheel engaging with the star wheel, a shaft on which the pin wheel is disposed, a fly wheel on the pin wheel shaft, a ring gear on the fly wheel, a drive pinion engaging the ring gear, a motor shaft on which the drive pinion is disposed, the axis of the motor shaft being in line with the axis of the rotor and the sprocket shaft, and a gear on the pin wheel shaft, and a worm on the shutter shaft meshing with the gear on the pin wheel shaft.

AUGUSTO DINA.